United States Patent [19]

Chatterjee et al.

[11] Patent Number: 5,805,968
[45] Date of Patent: Sep. 8, 1998

[54] CERAMIC ROLLERS

[75] Inventors: Dilip K. Chatterjee, Rochester; Jiann-Hsing Chen, Fairport; Tonya D. Binga, Rochester, all of N.Y.

[73] Assignee: Eastman Kodak Company, Rochester, N.Y.

[21] Appl. No.: 822,163

[22] Filed: Mar. 21, 1997

[51] Int. Cl.$^6$ .................................................. G03G 15/20
[52] U.S. Cl. ........................ 399/324; 399/328; 399/333
[58] Field of Search ................................ 399/320, 324, 399/325, 328, 330, 331, 333, 335, 339; 430/97

[56] References Cited

U.S. PATENT DOCUMENTS

| | | |
|---|---|---|
| 4,870,445 | 9/1989 | Collier et al. ............................ 399/325 |
| 4,941,251 | 7/1990 | Sobue et al. . |
| 5,008,221 | 4/1991 | Ketcham . |
| 5,045,890 | 9/1991 | DeBolt et al. ............................ 399/325 |
| 5,322,970 | 6/1994 | Behe et al. ............................... 399/279 |
| 5,450,183 | 9/1995 | O'Leary ............................... 399/328 X |
| 5,543,269 | 8/1996 | Chatterjee et al. . |

*Primary Examiner*—Sandra L. Brase
*Attorney, Agent, or Firm*—Raymond L. Owens

[57] ABSTRACT

A fuser for fixing particulate imaging material to a receiver sheet, includes two rollers which engage each other at a fixing nip, wherein pressure is used in fixing the particulate imaging material to the receiver sheet; and at least one of the fusing rollers having a surface formed from zirconia ceramic or its composites which has a hardness greater than 12 GPa and toughness greater than 6 MPa$\sqrt{mm}$.

9 Claims, 1 Drawing Sheet

1

CERAMIC ROLLERS

CROSS REFERENCE TO RELATED APPLICATION

Reference is made to commonly-assigned and concurrently filed U.S. Pat. application Ser. No. 08/821991 entitled "Toner Offset Preventing Oils for Zirconia Ceramic and Its Composites Rollers" by Chatterjee et al, the teachings of which are incorporated herein by reference.

FIELD OF THE INVENTION

The present invention relates to rollers, such as transfer rollers, heater rollers and fuser rollers for use in copying apparatus or the like.

BACKGROUND OF THE INVENTION

Electrophotosensitive copiers include a photoconductor with a photoconductive layer with a conductive backing. The photoconductor is transported along an endless path relative to a plurality of work stations, each of which is operative when actuated to perform a work operation on the electrophotosensitive medium. Such stations include a charging station at which a uniform charge is placed on the photoconductive layer, an exposure station at which the charged photoconductive layer is image-wise exposed to actinic radiation from the medium to create an electrostatic image of the medium in the photoconductive layer, a developing station at which the electrostatic image is contacted with finely divided charged toner particles for adhering to the photoconductive layer in a configuration defined by the electrostatic image, a transfer station at which such toner particles are transferred in the image configuration to a receiving surface, and a cleaning station at which residual toner is removed from the photoconductive layer so that it can be reused.

One of the most effective forms for transfer station has been fusing rollers. Frequently, at least one of the rollers is heated so that both heat and pressure are applied to toner particles at the nip between the rollers to fix the toner to a receiver sheet in an image-wise configuration.

Fuser rollers performance reliability is one of the most important factors which influences the electrophotographic copier life cycle cost and customer satisfaction. Fuser rollers, when heated externally via a heater roller, are affected by the ability of the heater roller to remain free of contamination.

Known to the electrostatographic fixing art are various fuser members adapted to apply heat and pressure to a heat-softenable electrostatographic toner on a receiver, such as paper, to permanently fuse the toner to the receiver rollers, fuser plates and fuser belts for use in fuser systems such as fuser roller systems, fuser plate systems and fuser belt systems. The term "fuser roller" is used herein to identify one of the elements of a fusing system. Commonly, the fuser roller is a fuser roller or pressure roller and the discussion herein may refer to a fuser roller or pressure roller. However, often the fuser roller is heated so that pressure and heat is applied to fuse a toner image.

One of the long-standing problems with electrostatographic toner fusing mechanism is the adhesion of the heat-softened toner particles to the surface of a fuser member and not to the receiver, known as "offset" which occurs when the toner-bearing receiver is passed through a fuser system. There have been several approaches to decrease the amount of toner offset onto fuser members. One approach has been to make the toner-contacting surface of a fuser member, for example, a fuser roller and/or pressure roller of a non-adhesive (non-stick) material.

One known non-adhesive coating for fuser members comprises fluoropolymer resins, but fluoropolymer resins are non-compliant. It is desirable to have compliant fuser members to increase the contact area between a fuser member and the toner-bearing receiver. However, fuser members with a single compliant rubber layer absorb release oils and degrade in a short time leading to wrinkling artifacts, non-uniform nip width and toner offset. To make fluoropolymer resin coated fuser members with a compliant layer, U.S. Pat. Nos. 3,435,500 and 4,789,565 disclose a fluoropolymer resin layer sintered to a silicone rubber layer which is adhered to a metal core. In U.S. Pat. No. 4,789,565, an aqueous solution of fluoropolymer resin powder is sintered to the silicone rubber layer. In U.S. Pat. No. 3,435,500, a fluoropolymer resin sleeve is sintered to the silicone rubber layer. Sintering of the fluoropolymer resin layer is usually accomplished by heating the coated fuser members to temperatures of approximately 500° C. Such high temperatures can have a detrimental effect on the silicone rubber layer causing the silicone rubber to smoke or depolymerize, which decreases the durability of the silicone rubbers and the adhesion strength between the silicone rubber layer and the fluoropolymer resin layer. Attempts to avoid the detrimental effect of the high sintering temperatures that have on the silicone rubber layer have been made by using dielectric heating of the fluoropolymer resin layer, for example, see U.S. Pat. Nos. 5,011,401 and 5,153,660. Dielectric heating is, however, complicated and expensive and the fluoropolymer resin layer may still delaminate from the silicone rubber layer when the fuser members are used in high pressure fuser systems. In addition, a fuser member made with a fluoropolymer resin sleeve layer possess poor abrasion resistance and poor heat resistance.

When a fuser roller becomes contaminated with toner, the contamination can be transferred to the heater roller, thus contributing to the failure. The contamination of the fuser roller can also contribute to the paper jam failure in an electrophotographic engine and it is primarily due largely to the inability of the paper itself to release from the fusing roller. The toner release from the rollers in the electrophotographic engine, which commonly termed as "offset", is sometimes aided by applying a suitable oil on the roller surface. A probable mechanism for the reduction in offset with oil is that oil flowing into the pores on the surface of the roller material forms a barrier. This barrier is an aid in retarding the offset of contamination. The viscosity of various oils and their molecular structure determine whether the oils will be adsorbed to the roller surfaces. The increase in viscosity makes the displacement of oil from the roller surface more difficult. If a high molecular weight oil is adsorbed on the roller surface, entropy considerations suggest that such oil molecules will have to detach from several sites simultaneously, to regain mobility, making detachment less probable.

The surface energy of the roller material, and its surface morphology can also influence the degree of toner release (offset). Other important material properties such as, wear and abrasion characteristics, thermal conductivity and reactivity or bonding with various functional oils, which are normally used to reduce the offset characteristics can contribute to the choice for suitable heater and pressure roller materials. The commonly used roller material such as elastomers and other experimental roller such as hardcoat anodized rollers, teflon, electroless nickel and electroless nickel impregnated with teflon lack one or more shortcomings in material characteristics described above, and contribute to varying degrees of toner offset.

SUMMARY OF THE INVENTION

It is an object of the present invention to provide a fuser roller which eliminate the problems discussed above.

This object is achieved in a fuser for fixing particulate imaging material to a receiver sheet, comprising:

(a) two rollers which engage each other at a fixing nip, wherein pressure is used in fixing the particulate imaging material to the receiver sheet;

(b) at least one of the fusing rollers having a surface formed from zirconia ceramic or its composites which has a hardness greater than 12 GPa and toughness greater than 6 MP$\sqrt{mm}$; and (c) an offset preventing oil which reacts with the zirconia ceramic or its composites to prevent offset of the particulate imaging material.

Fusing rollers in accordance with the present invention have increased hardness, toughness and are chemically resistant to corrosion. When used in electrophotographic apparatus, fusing or fixing is improved and jamming of receiver sheets is reduced. Fuser roller life is improved because of the high wear and abrasion resistant properties of zirconia and its composites.

The unusually high wear abrasion and corrosion resistance of these materials make them particularly suitable for roller material in an electrophotographic apparatus. In the charging section of electrophotographic copiers, ozone may be generated which is a highly corrosive gas. Materials in accordance with the present invention are resistant to attack by ozone.

DETAILED DESCRIPTION OF THE PREFERRED EMBODIMENTS

Figure 1A:
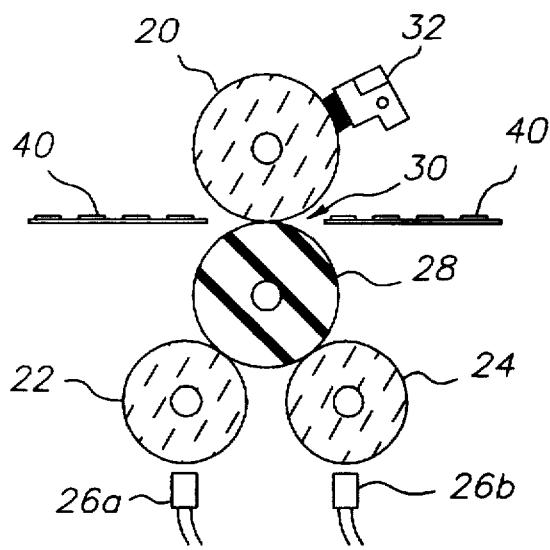
FIG. 1a is a schematic elevational view of a fusing apparatus in accordance with the present invention.

Referring now to FIG. 1a a fusing apparatus is shown which includes a ceramic fusing roller 20 and an elastomeric pressure roller 28 which form a nip 30. The ceramic fusing roller 20 can be made of zirconia ceramic and its composites (see FIG. 2). Toner 40 disposed on a receiver is fused into the receiver at the nip 30 by the application of heat and pressure. It will be understood depending on the toner that is used that only pressure need be applied to fuse toner 40 into the receiver. A wicking device 32 wicks offset preventing oil onto the surface of the ceramic fusing roller 20. A continuous supply of offset preventing oil must be used which is approximately 1 to 20 mg per receiver, on which toner is fused. This offset preventing oil will be discussed in much more detail later. The pressure roller 28 is nested in two spaced apart rollers 22 and 24. These rollers are preferably made of $ZrO_2Al_2O_3$ (zirconia composite). The zirconia composite more thermal conductivity than zirconia and so it is used to provide rollers which transfer heat. On the other hand, zirconia is a poor heat conductor and so after it is heated it will maintain a given temperature for a longer time.

Figure 1B:
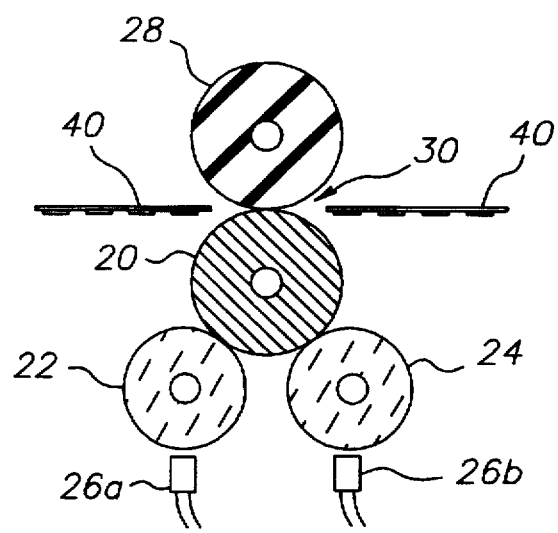
FIG. 1b is a schematic elevational view of another fusing apparatus in accordance with the present invention.

Turning now to FIG. 1b where a fusing apparatus similar that shown in FIG. 1a with the exception that the rollers 22 and 24 contact the ceramic fusing roller 20 rather than the pressure roller 28. The operation of this structure is similar to that of FIG. 1a. It will be understood to those skilled in the art the fusing apparatus of FIG. 1a and 1b are suitable for use in fusing toner images in an electrostatographic copier or printer. As will become clear later, when a fusing roller is made of zirconia ceramic or its composites an offset preventing oil must be used to prevent offset of toner particles onto the roller. Offset preventing oil is applied to the surface of either the fusing roller to the pressure roller. However, those skilled in the art will appreciate that toners can be designed with offset preventing ingredients which would minimize or eliminate the need for application of offset preventing oils. Other combinations of rollers can also be used in accordance with the present invention. However, the fusing roller should always be a ceramic roller which forms a nip with a compliant roller which fuses the toner into the receiver. The offset preventing oil can be applied by a number of different arrangements, for example the offset preventing oil can be wicked onto a donor roller.

Figure 2:
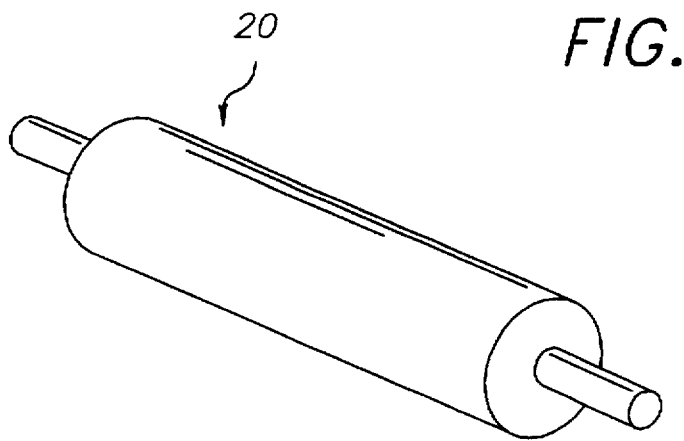
FIG. 2 is a perspective of a fuser roller in accordance with the present invention.

Referring now to FIG. 2, the fuser roller 28, unlike conventional fuser rollers is formed of a ceramic in accordance with the present invention which will be described later. Although the fuser roller 28 is shown as solid, it can also have an internal cavity. The fuser roller 28 is formed of zirconia ceramic or its composites. Zirconia has the chemical composition of $ZrO_2$ and with a predominately tetragonal crystal structure. The composites of zirconia can take many forms, however, in accordance with this invention that term shall mean alumina composites ($ZrO_2$—$Al_2O_3$), which will be discussed in more detail later. These materials, because of its specific crystallographic nature, which will be described later, have high hardness, and unusually high fracture toughness for ceramics. The zirconia ceramic and its composites materials have a hardness greater than 12 GPa and toughness greater than 6 MP$\sqrt{mm}$. Sometimes it is desirable to heat the roller and in such a case, the fuser roller 28 would be formed with a cavity and a heated lamp can be provided inside of either or both of the rollers 26 and 28. The pressure rollers are formed of different compliant materials such as silicon, or fluorocarbon.

Zirconia ceramic, particularly yttria doped tetragonal zirconia polycrystals (Y-TZP) and its composites such as $ZrO_2$—$Al_2O_3$ are known to posses high wear and abrasion resistance. Tetragonal zirconia also has high hardness and high fracture in toughness. It is also known that surface energy of the zirconia ceramics and its composites can be modified by changing the oxidation states of the materials. It is further known that infrared energy can be successfully utilized to modify both the surface morphology and surface energy of zirconia ceramics and its composites.

Pure zirconia powder is alloyed with stabilizing agents as described by Chatterjee et al in commonly-assigned U.S. Pat. No. 5,358,913 to form zirconia alloy powder which has predominately tetragonal crystal structure. One such example of such powder is yttria stabilized tetragonal zirconia polycrystals (Y-TZP). Y-TZP can also be mixed with other ceramic powders to form composites. One example of such composites is zirconia-alumina composites, where alumina concentration can vary from 0.1 to 50 weight percent. It has been found preferable to use a weight percentage of alumina of about 20 percent.

The powders described above form the starting materials for the formation and manufacture of rollers for the electrophotographic engine. The rollers can be manufactured either by cold pressing or cold isostatic pressing or by injection molding and sintering. The various procedures for manufacturing rollers using ceramic materials, particularly for Y-TZP and its composites are disclosed by Ghosh et al in commonly-assigned U.S. Pat. No. 5,336,282 and Chatterjee et al in commonly-assigned U.S. patent application Ser. No. 08/740,452 filed Oct. 28, 1996.

Ytrria-doped tetragonal zirconia polycrystal (Y-TZP) ceramic materials offer many advantages over conventional materials, including many other ceramics. Y-TZP is one of the toughest ceramics. The toughness is achieved at the expense of hardness and strength. Tetragonal zirconia alloy-alumina composite, that is, the product of sintering a particulate mixture of zirconia alloy and alumina, is another tough and relatively softer structural ceramic composite.

The zirconium oxide alloy is made essentially of zirconium oxide and a secondary oxide selected from the group consisting of MgO ,CaO, $Y_2O_3$, $Sc_2O_3$,$Ce_2O_3$ and rare earth oxides. Moreover, the zirconium oxide alloy has a concentration of the secondary oxide of, in the case of $Y_2O_3$, about 0.5 to about 5 mole percent; in the case of MgO, about 0.1 to about 1.0 mole percent, in the case of $CeO_2$, about 0.5 to about 15 mole percent, in the case of $Sc_2O_3$, about 0.5 to about 7.0 mole percent and in the case of CaO from about 0.5 to about 5 mole percent, relative to the total of the zirconium oxide alloy. A mold is provided for receiving and processing the zirconia alloy ceramic powder or its composites. The ceramic powder is then compacted by cold isostatic pressing in the mold provided to form a ceramic blank or billet. The ceramic billet is then shaped or green-machined so as to form near net-shaped roller. The term "green" refers to the ceramic roller before sintering. After the initial shaping, the green rollers are sintered thereby forming sintered net-shaped ceramic rollers. The ceramic rollers for the electrophotographic apparatus described above, are then further machined or shaped until finished rollers are formed.

The preferred ceramic composite powder mixture most preferred in the method of making zirconia-alumina ceramic composites of the invention includes a particulate zirconia alloy and a particulate alumina made by mixing $ZrO_2$ and additional "secondary oxide" selected from: MgO, CaO, $Y_2O_3$, $Sc_2O_3$ and $Ce_2O_3$ and other rare earth oxides (also referred to herein as "Mg—Ca—Y—Sc—rare earth oxides") and then with $Al_2O_3$. Zirconia alloys useful in the methods of the invention have a metastable tetragonal crystal structure in the temperature and pressure ranges at which the ceramic article produced will be used. For example, at temperatures up to about 200° C. and pressures up to about 1000 MPa, zirconia alloys having, wherein zirconium oxide alloy has a concentration of said secondary oxide of, in the case of $Y_2O_3$, about 0.5 to about 5 mole percent; in the case of MgO, about 0.1 to about 1.0 mole percent, in the case of $Ce_2O_3$, about 0.5 to about 15 mole percent, in the case of $Sc_2O_3$, about 0.5 to about 7.0 mole percent and in the case of CaO from about 0.5 to about 5 mole percent, relative to the total of said zirconium oxide alloy, said compacting further comprising forming a blank and then sintering, exhibit a tetragonal structure. Preferred oxides for alloying with zirconia are $Y_2O_3$, MgO, CaO, $Ce_2O_3$ and combinations of these oxides. It is preferred that the zirconia powder have high purity, greater than about 99.9 percent. Specific examples of useful zirconia alloys include: tetragonal structure zirconia alloys having from about 2 to about 5 mole percent $Y_2O_3$, or more preferably about 3 mole percent $Y_2O_3$. Examples of tetragonal structure zirconia alloys are disclosed in U.S. Pat. No. 5,290,332. Such zirconia alloys are described in that patent as being useful to provide a ceramic roller.

The grain and agglomeration sizes and distributions, moisture contents, and binders (if any) can be varied in both the alumina and the zirconia alloy, in a manner known to those skilled in the art. "Grain" is defined as an individual crystal, which may be within a particle, having a spatial orientation that is distinct from that of adjacent grains. "Agglomerate" is defined as an aggregation of individual particles, each of which may comprise multiple grains. In a particular embodiment of the invention, the grain and agglomeration sizes and distributions, and moisture contents of the alumina and the zirconia alloy are substantially the same and are selected as if the zirconia alloy was not going to be mixed with the alumina, that is in a manner known to the art to be suitable for the preparation of a zirconia alloy article.

An example of convenient particulate characteristics for a particular embodiment of the invention is the following. Purity of $ZrO_2$ is preferably well controlled at 99.9 to 99.99 percent, that is, impurities are no more than about 0.1 to 0.01 percent. The grain size is from about 0.1 micrometers to about 0.6 micrometers. The average grain size is 0.3 micrometers. The distribution of grain sizes is: 5–15 percent less than 0.1 micrometers, 40–60 percent less than 0.3 micrometers, and 85–95 percent less than 0.6 micrometers. The surface area of each individual grain ranges from about 10 to about 15 $m^2$/gram or is preferably 14 $m^2$/gram. Agglomerate size is from about 30 to about 60 micrometers and average agglomerate size is: 40–60 micrometers. Moisture content is about 0.2 to 1.0 percent by volume of blank and is preferably 0.5 percent. The mixture of particulate is compacted in the presence of an organic binder.

Binders such as gelatin or polyethylene glycol(PEG) or acrylic or polyvinyl ionomer or more preferably polyvinyl alcohol, are added to and mixed with the particulate mixture Y-TZP, or a composite mixture of Y-TZP and alumina. This can be achieved preferably by spray drying or ball milling prior to placement of the mixture in a compacting device.

The particulate mixture of zirconia alloy and/or zirconia-alumina ceramic composite is compacted; heated to a temperature range at which sintering will occur; sintered, that is, maintained at that temperature range for a period of time; and then cooled. During sintering, individual particles join with each other and transform from "green preform" to a dense article. This densification is achieved by diffusion controlled process. In an alternate embodiment, during all or part of sintering, the particulate mixture compact or the "green preform" is kept in contact with a preselected dopant, as discussed below in detail, to further improve the surface properties of the sintered articles.

Preferably, the powder mixture is cold compacted to provide a "green preform", which has a "green" density that is substantially less than the final sintered density of the ceramic roller of electrophotographic apparatus. It is preferred that the green density be between about 40 and about 65 percent of the final sintered density, or more preferably be about 60 percent of the final sintered density.

Then the green rollers are sintered to full density using preferably sintering schedules described in U.S. Pat. Nos. 5,336,282 and 5,358,913, hereby incorporated hereby by reference, and final precision machining of the final sintered rollers were made to tight tolerances to produce the rollers of electrophotographic apparatus of the invention using diamond tools. Near net-shaped green preforms produced either by dry pressing or by injection molding, respectively, did not warrant green machining to generate net-shaped rollers after sintering. Only billets or blanks of zirconia ceramic or its composites produced by cold isostatic pressing needed green machining before sintering. The near-net-shaped green preform produced by injection molding needed an additional step called "debinding" wherein excess organic binders are removed by heating the preforms at around 250° C. for about 12 hours prior to sintering.

In an alternate embodiment of the sintering process, the dopant oxide selected from MgO, FeO, ZnO, CoO, NiO, and MnO, and combination thereof, is in contact with the blank. It is preferred that the sintering result in a ceramic and/or composite rollers having a "full" or nearly theoretical density, and it is more preferred that the density of the ceramic rollers be from about 99.5 to about 99.9 percent of theoretical density. Sintering is conducted in air or other oxygen containing atmosphere.

Sintering can be performed at atmospheric pressure or alternatively a higher pressure, such as that used in hot isostatic pressing can be used during all or part of the sintering to reduce porosity. The sintering is continued for a sufficient time period for the case of the article being sintered to reach a thermodynamic equilibrium structure. An example of a useful range of elevated sintering pressures is from about 69 MPa to about 207 MPa, or more preferably about 100 to 103 MPa.

The toners used in the working and comparative examples of this invention are 100 percent unfused EK1580 toner (Eastman Kodak Company, Rochester, N.Y.). The off-line testing of the roller material is carried out both in the "dry" condition and also in the "wet" condition, where the roller materials, in the form of a plate are treated with offset preventing oils. The experimental set-up for the off-line test, wherein a heated bed on which the roller materials of interest were placed. An inch square piece of paper with 100% unfused toner laydown was then placed in intimate contact with the roller materials in the specific case, Y-TZP and its composites with alumina. To ensure the intimate contact a clamp was used. The bed of the tester is heated to predetermined fusing temperatures and a thermocouple (not shown) registers this temperature. Two temperatures, 165° C. and 190° C. were used. A pressure application device set for 80 pounds per square inch was then locked in place over the roller material/toner/paper sandwich. The pressure was applied for such off-line testing from a minimum of 30 seconds to a maximum, in most cases of 20 minutes. The release characteristics were evaluated by visual inspection of the fused paper.

The ceramic rollers of this invention was also irradiated with infrared energy specifically with a Nd-YAG laser of 1.06 μm wavelength operated at various conditions. Laser assisted irradiation of these materials causes a surface chemical composition change of the ceramic materials used in this invention. As disclosed by Chatterjee et al in commonly-assigned U.S. Pat. No. 5,543,269 laser induced surface, that the chemical composition change is associated with surface energy change and it is believed in the specific case of the present invention that reactivity of the toner particles with the roller material are modified through the change in its surface energy. However, laser irradiation of materials can be a source of degradation of surface morphology. The rough surface morphology can cause toner offset. Hence, laser irradiation parameters have to be selected judiciously to take advantage of the surface energy reduction.

Quite unexpectedly it has been found that certain offset preventing oils react with zirconia ceramic or its composites to prevent offset. In accordance with the present invention, it has been found to be highly desirable to first react the surface of the fusing roller with these offset preventing oils. Thereafter, during the process of fusing toner images these offset preventing oils can be wicked onto the surface of the fuser roller during the process of fusing toner images. The following is a discussion of the different offset preventing oils which can be used with treated and untreated fuser rollers.

Before, however, beginning this discussion the results will be briefly summarized. It should be noted that the fusing roller will always be a ceramic roller made of zirconia or its composites and the pressure roller will always have a compliant surface. The ceramic roller can either be treated or untreated with IR laser energy, whether it is zirconia or zirconia composites. The following summary shows the types of offset preventing oil that will be effective with treated and untreated zirconia and treated and untreated zirconia composites.

TABLE I

| Fusing Roller | Zirconia ($ZrO_2$) | Zirconia Composites ($ZrO_2 - Al_2O_3$) |
|---|---|---|
| Two Material Processing for Each Material | 1) Untreated<br>2) Treated with IR Laser | 1) Untreated<br>2) Treated with IR Laser |
| Three Oils (for untreated materials) for release | 1) Non functional<br><br>$CH_3$<br>\|<br>$CH_3-Si-O$<br>\|<br>$CH_3$<br><br>2) Silane<br>$H-Si-$<br>3) Amino<br>$H_2N-CH_2CH_2CH_2-$ | 1) Non-functional<br><br>$CH_3$<br>\|<br>$CH_3-Si-O$<br>\|<br>$CH_3$<br><br>2) Silane<br>$H-Si-$<br>3) Amino<br>$H_2N-CH_2CH_2CH_2-$ |
| Two Oils (for IR Laser Treated Materials) for release | 1) Silane<br>$H-Si-$<br>2) Amino<br>$H_2N-CH_2CH_2CH_2-$ | 1) Silane<br>$H-Si-$<br>2) Amino<br>$H_2N-CH_2CH_2CH_2-$ |

Laser Irradiation Conditions

Nd:YAG Laser:Wavelength=106 μm
Pulse Frequency=1 KHz
Bite Size=0.05209 Watts
Peak Power=6,000–67,000 Watts
Current=18–28 amps
Energy=0.6 mJ to 5.2 mJ
Energy Density=7 J/cm$^2$ to 66 J/cm$^2$ The fuser rollers produced in accordance with the present invention are useful in electrophotographic copying machines to fuse heat-softenable toner to a substrate. This is accomplished by contacting a receiver, such as a sheet of a paper, to which toner particle are electrostatically attached in an imagewise fashion, with such a fuser member. Such contact is maintained at a temperature and pressure sufficient to fuse or fix the toner to the receiver. Because these members are so durable they can be cleaned using a blade pad, roller or brush during use. The following is a discussion of offset preventing oils that can be used with an untreated ceramic fuser roller and with a treated (irradiated) ceramic rollers that can be used in accordance with this invention. It has been found that in either case offset preventing oils that are effective have compounds having functional groups selected from the group including —CH$_2$—CH$_2$—CH$_2$—NH$_2$ and

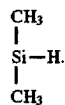

When untreated ceramic fuser rollers are used, the offset preventing oil has functional groups selected from the groups consisting of —CH$_2$—CH$_2$—CH$_2$—NH$_2$,

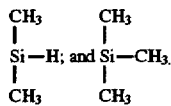

When treated ceramic fuser rollers are used the offset preventing oil has functional groups selected from the groups consisting of —CH$_2$—CH$_2$—CH$_2$—NH$_2$ and

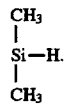

Another aspect of the change in the reactivity of the toner particles with some functional offset preventing oils. As described hereinafter that the reactivity of toner particles with the roller materials is hindered by formation of some sort of barriers caused by the absorption of offset preventing oils into the pores of the roller materials. The rehological property, such as viscosity and the chemical property, such as molecular weight of the offset preventing oils will greatly influence the barrier formation between the toner particles and the roller materials.

Chemical structure of functional polydimethyl siloxane and non-functional polydimethyl siloxane (PDMS) which will be discussed as follows:

1. Non-functional PDMS

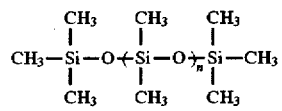

wherein
n:50≦n≦1000

2. Mercapto functional PDMS

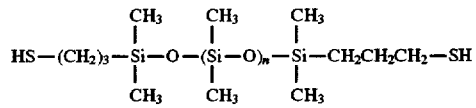

wherein:
n:50≦n≦1000

3. Silane functional PDMS

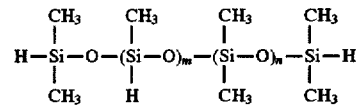

wherein
m,n: 1%≦m≦99%
1%≦n≦99%
m+n=100%

4. Amino functional PDMS

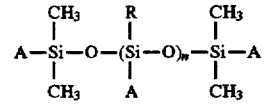

wherein
A: is—CH$_2$—CH$_2$—CH$_2$—NH$_2$
n: 50≦n≦1000
R: is an alkyl or aryl group

*Examples* (for laser irradiated zirconia ceramic or its composites rollers):

The affinity of the functional offset preventing oil of this invention to laser treated ceramic fuser member surface in the process of the present invention can be assessed from the results of applying functional polydimethyl siloxane release offset preventing oil to a fuser member surface (Heated Roll) comprising, for example, a 18 amp zirconia ceramic or its composites samples laser treated using 18 amps incubating the samples for overnight (12 hrs) at 170° C. in contact with the functional PDMS, and then subjecting the ceramic surface to soak in DCM (dichloromethane) for one hour, removed and wiped to clean unreacted functional offset preventing oil. Qualitative measurements of the attachment of the polydimethyl siloxane to the surface of the laser treated ceramic were carried out by the off-line toner combination unit. The off-line test for toner contamination is a heated bed on which the ceramic samples are placed. A 1" square piece of paper with 100% unfused EK1580 toner is put in contact with the ceramic samples which are cut into a 1" squares. The sandwich is then heated to a temperature of 175° C. A pressure roller set for 80 psi is then locked in place over the sample for 20 minutes. The test forms a nip under pressure and the interaction between the toned paper and the ceramic sample in the nip area is examined using an optical microscope. The toner release performance of the ceramic sample is assessed by the amount of toner (offset) on the surface of the ceramic sample.

Three major types of functional offset preventing oil (silane functional offset preventing oil, amino functional offset preventing oil, and mercapto functional offset preventing oil) were used in the test. In addition, the non-functional offset preventing oil and no offset preventing oil also were used as controls.

Specific examples of commercially available functionalized polydimethylsiloxanes of utility in this invention include:

1) organohydrosiloxane copolymers such as (a) PS 123, (30–35%) methylhydro—(65–70%) dimethylsiloxane (b) PS 124.5, (3–4%) methylhydro—(96–99%) dimethylsiloxane which are available from United Chemical, Inc.

2) aminopropyldimethyl terminated polydimethylsiloxane Xerox 5090 fuser agent which is available from Xerox 3) mercapto functional polydimethylsiloxane Xerox 5090 fuser agent which is available from Xerox 4) non-functional polydimethylsiloxane, trimethylsiloxane terminated DC-200, 350 Cts which is available from Dow Corning Table II below shows the results obtained from the examples.

TABLE II

| Zirconia Ceramic and its Composite Materials* | Siloxane | Organopoly-Group | Functional Offset | Oil Reactivity |
|---|---|---|---|---|
| 18 amp | None | None | Heavy | No |
| 18 amp | DC-200, 350 Cts | trimethyl- siloxane | Heavy | No |
| 18 amp | Xerox 5090 fuser agent | mercapto- propyl | Heavy | No |
| 18 amp | PS-123 | hydro- silane | None | Yes |
| 18 amp | PS-124.5 | hydro- silane | None | Yes |
| 18 amp | Xerox 5090 fuser agent | amino- propyl | Slight | Yes |
| 24 amp | PS-124.5 | hydro- silane | Heavy | No |
| 24 amp | Xerox 5090 fuser agent | amino- propyl | Heavy | No |
| 24 amp | Xerox 5090 fuser agent | mercapto- propyl | Heavy | No |

*Laser treated using conditions described in Table I.

For a surface (ceramic fusing member) reacted and covered with functional polydimethylsiloxane, the toner offset should be zero or close to zero (slight offset). Referring to Table II, the non-functionalized polydimethylsiloxane DC-200 or no offset preventing oil used provide no offset preventing oil coverage on the ceramic samples. Use of the Si—H functionalized polydimethylsiloxane PS-123, and PS-124.5 provide superior toner release properties. Use of the aminopropylsiloxane functionalized polydimethylsiloxane Xerox 5090 fuser agent also provides the offset preventing oil coverage, but this functional offset preventing oil suffers slight offset. Thus, results as good or better than those with the non-functionalized polydimethylsiloxane or no polydimethylsiloxane can be obtained by use of a functional polydimethylsilxoane comprising a Si—H functionalized PDMS or aminopropyl functionalized PDMS with the zirconia ceramic and its composites laser treated following the conditions described in Table I in accordance with the invention.

Referring to Table II, the use of a zirconia ceramic and its composites laser treated using 24 amps following the conditions described in Table I with the functionalized PDMS (see C-4, C-5, C-6) did not provide any offset preventing oil coverage on the ceramic samples. The laser operating conditions for treatment of zirconia ceramic and its composite samples are important.

The high affinity of Si—H functionalized and aminopropyl functionalized organopolysiloxane with the 18 amp ceramic compound for heat roller surface provides excellent release of fused toner image. Use of this surface as a heat roll in a fusing process provides a highly effective way of meeting the need for excellent release characteristics without excessive wear of the heat roll surface.

*Examples* (untreated zirconia ceramic or composite rollers)

The affinity of functional offset preventing oil of this invention to untreated (non-laser irradiated) ceramic fuser member surface in the process of this invention can be assessed from the results of apply functional polydimethylsiloxane release offset preventing oil to a fuser member surface (Heated Roll) comprising an untreated ceramic $ZrO_2$. The samples were treated and tested similar to the previous examples.

Referring to Table III below, the mercapto functionalized PDMS and no offset preventing oil provide no protection on the surface of the ceramic sample. Use of Si—H functionalized PDMS PS-123, PS-124.5, aminopropyl functionalized PDMS and non-functionalized PDMS provide superior toner release property on the untreated $ZrO_2$ ceramic materials. Use of this surface in a fusing process provides a highly effective way of meeting the need for excellent release characteristics without excessive wear of the fuser member and without encountering the problems of odor and toxicity associated with use of mercapto-functional polydimethylsiloxanes.

Table III below shows the results obtained from the examples of untreated zirconia ceramic or its composites.

TABLE III

| Zirconia Ceramic and its Composite Materials | Organopoly-siloxane | Toner Offset | Oil Reactivity |
|---|---|---|---|
| untreated | None | Heavy | No |
| untreated | Xerox 5090 fuser agent Mercapto-functionalize | Heavy | No |
| untreated | PS-123 Si-H functionalized | None | Yes |
| untreated | PS-124.5 Si-H functionalized | Slight | Yes |
| untreated | Xerox 5090 Amino-function fuser agent | Slight | Yes |
| untreated | DC-200 | Slight | Yes |

The invention has been described in datail with particular reference to certain preferred embodiments thereof, but it will be understood that variations and modifications can be effected within the spirit and scope of the invention.

PARTS LIST 20 fusing roller
22 heater roller
24 heater roller
28 pressure roller
30 nip
32 wicking device
40 toner

What is claimed is:

1. A fuser for fixing particulate imaging material to a receiver sheet, comprising:

(a) two rollers which engage each other at a fixing nip, wherein pressure is used in fixing the particulate imaging material to the receiver sheet;

(b) at least one of the fusing rollers having a surface formed from zirconia ceramic or its composites which has a hardness greater than 12 GPa and toughness greater than 6 MPa$\sqrt{mm}$; and (c) an offset preventing oil which reacts with the zirconia ceramic or its composites to prevent offset of the particulate imaging material.

2. A fuser for fixing toner imaging material to a receiver sheet, comprising:

(a) two rollers which engage each other at a fixing nip, wherein pressure is used in fixing the toner imaging material to the receiver sheet;

(b) one of the rollers having a surface formed from zirconia ceramic or its composites which has a hardness greater than 12 GPa and toughness greater than 6 MPa $\sqrt{mm}$ and the other roller being formed of a compliant material; and (c) an offset preventing oil selected so that it reacts with the zirconia ceramic or its composites to prevent offset of the particulate imaging material.

3. A fuser for fixing toner imaging material to a receiver sheet, comprising:

(a) two rollers which engage each other at a fixing nip, wherein at least one of the rollers is heated so that pressure and heat are used to fix the toner imaging material to the receiver sheet;

(b) one of the rollers having a surface formed from treated zirconia ceramic or its composites which has a hardness greater than 12 GPa and toughness greater than 6 MPa $\sqrt{mm}$, wherein the zirconia is treated by applying infrared energy to the zirconia to change the composition of the zirconia or its composites; and the other roller being formed of a compliant material; and (c) means for applying an offset preventing oil to the ceramic roller which reacts with the zirconia ceramic or its composites prior to fusing toner and thereby prevents offset of the particulate imaging material.

4. The fuser for fixing toner imaging material according to claim 3 further including means for wicking offset preventing oil onto the surface of the roller formed of zirconia ceramic or its composites.

5. A fuser for fixing toner imaging material to a receiver sheet, comprising:

(a) two rollers which engage each other at a fixing nip, wherein at least one of the rollers is heated so that pressure and heat are used to fix the toner imaging material to the receiver sheet;

(b) one of the rollers having a surface formed from treated zirconia ceramic or its composites which has a hardness greater than 12 GPa and toughness greater than 6 MPa $\sqrt{mm}$, and the other roller being formed of a compliant material;

(c) means for applying heat to either of the roller surfaces so that heat and pressure are applied at the nip to fix the toner imaging material to the receiver sheet; and (d) means for applying an offset preventing oil to one of the rollers which is selected to react with the zirconia ceramic or its composites to prevent offset of the particulate imaging material.

6. The fuser for fixing toner imaging material to a receiver sheet according to claim 5, wherein the offset preventing oil was reacted with the zirconia ceramic or its composites prior to fusing toner and which prevents offset of the particulate imaging material.

7. The fuser for fixing toner imaging material to a receiver sheet according to claim 5 wherein the heating means includes at least one heated roller formed of zirconia ceramic or its composites for heating either of the rollers.

8. The fuser for fixing toner imaging material to a receiver sheet according to claim 5 wherein the heating means includes at least two heated rollers formed of zirconia ceramic or its composites.

9. The fuser for fixing toner imaging material to a receiver sheet according to claim 5 wherein the compliant roller is formed of an elastomeric material such as silicon or fluorocarbon elastomers.

* * * * *

UNITED STATES PATENT AND TRADEMARK OFFICE
CERTIFICATE OF CORRECTION

PATENT NO.   : 5,805,968
DATED        : September 8, 1998
INVENTOR(S)  : Dilip K. Chatterjee, et al It is certified that error appears in the above-identified patent and that said Letters Patent is hereby corrected as shown below:

On the title page, item [54] and column 1, line 1:

The title "CERAMIC ROLLERS" should be deleted and substituted with --ZIRCONIA CERAMIC ROLLER FOR FIXING PARTICULATE IMAGING MATERIAL TO A RECEIVER--

Signed and Sealed this

Twenty-ninth Day of December, 1998

Attest:

BRUCE LEHMAN

Attesting Officer

Commissioner of Patents and Trademarks